US010860203B2

United States Patent
Hiratsuka

(10) Patent No.: US 10,860,203 B2
(45) Date of Patent: Dec. 8, 2020

(54) TOUCH DISPLAY DEVICE HAVING LINEAR AND CIRCULAR ARC OPERATION MODES

(71) Applicant: Yamaha Corporation, Hamamatsu (JP)

(72) Inventor: Satoshi Hiratsuka, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 16/438,591

(22) Filed: Jun. 12, 2019

(65) Prior Publication Data

US 2019/0294309 A1    Sep. 26, 2019

Related U.S. Application Data

(63) Continuation of application No. PCT/JP2017/044778, filed on Dec. 13, 2017.

(30) Foreign Application Priority Data

Dec. 13, 2016 (JP) ................................. 2016-241474

(51) Int. Cl.
*G06F 3/0488* (2013.01)
*G06F 3/0485* (2013.01)
(Continued)

(52) U.S. Cl.
CPC ............ *G06F 3/0488* (2013.01); *G06F 3/041* (2013.01); *G06F 3/0484* (2013.01); *G06F 3/0485* (2013.01); *H04N 5/00* (2013.01)

(58) Field of Classification Search
CPC .................................................... G06F 3/0488
(Continued)

(56) References Cited

U.S. PATENT DOCUMENTS 8,525,799 B1 * 9/2013 Grivna .................. G06F 3/0416
345/173
2006/0022956 A1 * 2/2006 Lengeling ........... G06F 3/04845
345/173
(Continued)

FOREIGN PATENT DOCUMENTS

JP    2010-182197 A    8/2010
JP    2011-509448 A    3/2011

OTHER PUBLICATIONS

Japanese-language Office Action issued in counterpart Japanese Application No. 2016-241474 dated Nov. 12, 2019 with English translation (five (5) pages).

(Continued)

*Primary Examiner* — Long D Pham
(74) *Attorney, Agent, or Firm* — Crowell & Moring LLP

(57) ABSTRACT

In the display device according to the present disclosure, a linear operation mode, in which an image is changed by tracing an operation surface substantially along a straight line, and a circular-arc operation mode, in which an image is changed by tracing the operation surface substantially along a circular arc, are set as operation modes for changing images displayed on the operation surface by tracing an operation surface of a touch panel. A CPU extracts the characteristic manner in which the operation surface is traced based on information acquired from the touch panel when the operation surface is being traced, decides which one of the linear operation mode and the circular-arc operation mode as the operation mode based on the extracted characteristics is the operation mode, and changes to the other operation mode in response to a change in the characteristic manner in which the operation surface is traced.

20 Claims, 9 Drawing Sheets

(51) Int. Cl.
*H04N 5/00* (2011.01)
*G06F 3/041* (2006.01)
*G06F 3/0484* (2013.01)

(58) Field of Classification Search
USPC .......................................................... 345/173
See application file for complete search history.

(56) References Cited

U.S. PATENT DOCUMENTS

2010/0201644 A1    8/2010  Ohshita
2011/0037709 A1    2/2011  Cottarel et al.
2017/0364255 A1*  12/2017  Matsuda ............... G06F 3/0482

OTHER PUBLICATIONS

English translation of document C5 ("GarageBand for iOS 2.0.x (iPad): Set the Orientation for Control Knobs" filed on Jun. 12, 2019) (one (1) page).
International Search Report (PCT/ISA/210) issued in PCT Application No. PCT/JP2017/044778 dated Mar. 6, 2018 with English translation (four (4) pages).
Japanese-language Written Opinion (PCT/ISA/237) issued in PCT Application No. PCT/JP20171044778 dated Mar. 6, 2018 (four (4) pages).
"GarageBand '09 Getting Started", Apple, pp. 1-122, https://support.apple.com/ja_JP/manuals/garageband, (122 pages).
Yamaha, "Mobile Music Sequencer Manual", pp. 1-28, http://jp.yamaha.com/products/apps/mobile_sequencer/, (28 pages).
"GarageBand for iOS 2.0x (iPad)", Apple, retrieved Feb. 7, 2018, https://support.apple.com/kb/PH17235?locale=ja_Jp&viewlocale=ja_JP, (one (1) page).

\* cited by examiner

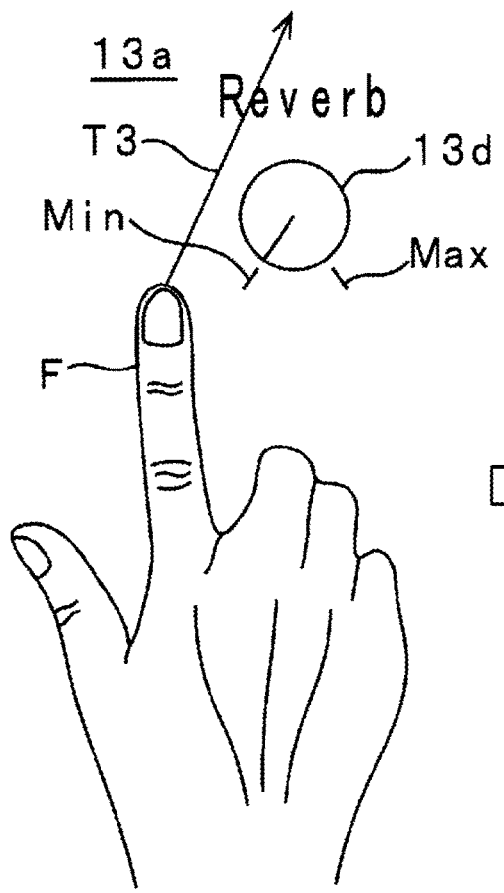
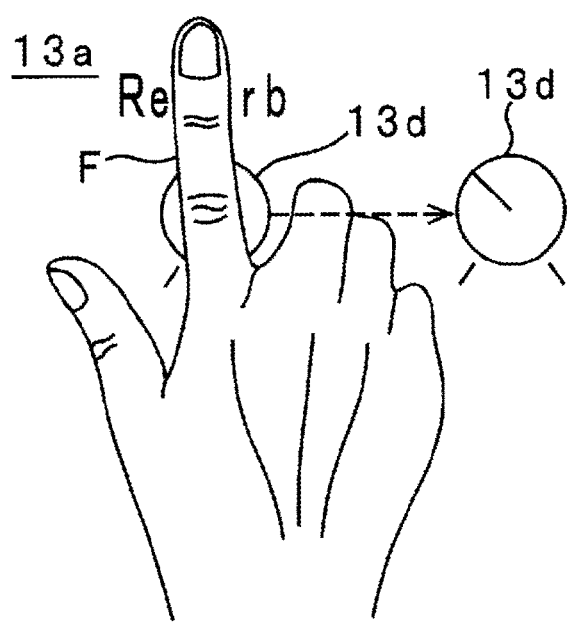
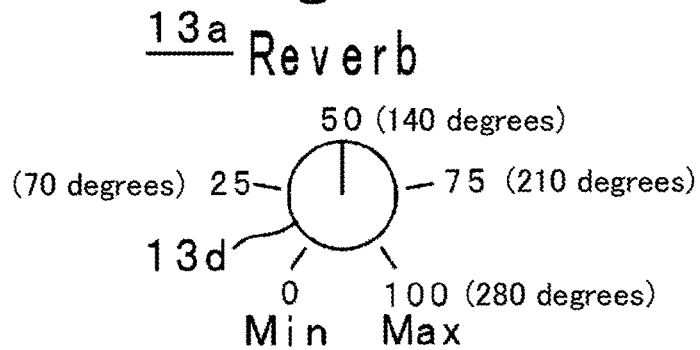

TOUCH DISPLAY DEVICE HAVING LINEAR AND CIRCULAR ARC OPERATION MODES

TECHNICAL FIELD

This disclosure relates to a display device provided with a touch panel, an image display method, and an non-transitory storage medium storing therein an image display program.

BACKGROUND ART

Conventionally, a display device 30 shown in FIG. 6 is known as this type of display device. The display device 30 is a tablet type of display device, and an application program for performing music production has been installed in the display device 30. The display device 30 includes a touch panel 13, and part of an image that represents a digital mixer used in music production is displayed on an operation surface 13a of the touch panel 13. In the example shown, a plurality of knobs (virtual knobs) are displayed. More specifically, a knob 13b for adjusting volume (labeled Volume in the drawing), a knob 13c for adjusting a pan pot (labeled Pan in the drawing), a knob 13d for adjusting the intensity of reverb which is one type of effect (labeled Reverb in the drawing), and a knob 13e for adjusting the intensity of chorus which is one type of effect (labeled Chorus in the drawing) are respectively displayed.

Each knob is rotated by tracing the operation surface 13a in the vicinity of that knob, and displays an adjustment amount by the rotational position of the knob. Operation modes of the knobs include a rotary operation mode and a linear operation mode depending on the manner of tracing the operation surface 13a. Here, each operation mode will be described in an example case of adjusting the intensity of reverb by operating the knob 13d. FIG. 7 illustrates the rotary operation mode. In FIG. 7A, reference sign T1 indicates the direction of tracing the operation surface 13a with a finger F. The rotary operation mode is an operation mode in which the knob 13d is rotated by tracing the operation surface 13a substantially along a circular arc along the periphery of the knob 13d. As shown in FIG. 7B, when the finger F traces substantially along a circular arc in the clockwise direction along the periphery of the knob 13d from the vicinity of a minimum value of the knob 13d (labeled Min in the drawing) toward a maximum value (labeled Max in the drawing), the knob 13d rotates to the right and reverb intensity increases. Also, in a case where the knob 13d has been rotated to the right, when the finger F traces substantially along a circular arc in the counter-clockwise direction along the periphery of the knob 13d from the vicinity of that rotational position toward the minimum value, the knob 13d rotates to the left and reverb intensity decreases.

FIG. 8 illustrates the linear operation mode. In FIG. 8A, reference sign T2 indicates the direction of tracing the operation surface 13a with the finger F. The linear operation mode is an operation mode in which the operation surface 13a in the vicinity of the knob 13d is traced substantially along a straight line in the vertical direction or the horizontal direction. As shown in FIG. 8B, when the finger F traces the operation surface 13a in the vicinity of the knob 13d substantially along a straight line from the bottom toward the top, the knob 13d rotates to the right and reverb intensity increases. Also, in a case where the knob 13d has been rotated to the right, when the finger F traces the operation surface 13a in that vicinity from the top toward the bottom, the knob 13d rotates to the left and reverb intensity decreases.

A display device is known in which, when the operation surface is traced in the initial state when the display device has been started up, the rotary operation mode or the linear operation mode is set based on the manner of that tracing, and each knob is rotated according to the operation mode that has been set (see Non-Patent Literature 1). Also, a display device is known in which an operator selects the rotary operation mode and the linear operation mode in a setting screen (Non-Patent Document 2).

CITATION LIST

Non-Patent Literature

Non-Patent Literature 1: "GarageBand '09 Getting Started" P. 93 (setting the pan position of a track) https://support.apple.com/ja_JP/manuals/garageband)
Non-Patent Literature 2: "YAMAHA Mobile Music Sequencer Manual" P. 24 table (OPERATION) (http://jp.yamaha.com/products/apps/mobile_sequencer/)

SUMMARY

However, the conventional former display device 30 decides the operation mode based on the manner of tracing when tracing the operation surface in the initial state, and operation is fixed to that operation mode, so a situation may occur where the operation mode intended by the operator and the manner of tracing do not match. FIG. 9 illustrates problems of the conventional former display device. For example, in FIG. 9A, it is assumed that, as indicated by reference sign T3, the operation surface 13a in the vicinity of the knob 13d was traced substantially along a straight line diagonally upward to the right from the bottom with the finger F. In this case, although the operator performed tracing while aware that the rotary operation mode was set, the display device 30 decides to set the linear operation mode, so the rotation amount of the knob 13d becomes less than the rotation amount intended by the user. For example, as shown in FIG. 9C, the operator intended to rotate the knob 13d to the position of 50, which is a median value between the minimum value and the maximum value, bu as shown in FIG. 9B, a state occurs in which the knob 13d is not rotated to the position of 50.

That is, in the conventional former display device 30, the operation mode may be set to a different operation mode than the operation mode intended by the operator, so there is a problem of poor operability. Also, in the conventional latter display device, it is necessary to select the operation mode in the setting screen, so in a case where the operator desires to change the operation mode during operation, each time, it is necessary to launch the setting screen to change the operation mode, so there is a problem that this takes time and effort.

It is one object of the disclosure to provide a display device of which operation is easy and convenient.

According to a first feature, a display device includes a touch panel and a control unit. The control unit sets, as an operation mode for changing an image displayed on an operation surface of the touch panel by tracing the operation surface, a linear operation mode in which the image is changed by tracing the operation surface substantially along a straight line, and a circular-arc operation mode in which the image is changed by tracing the operation surface substantially along a circular arc, and the control unit executes decision processing that discriminates a characteristic manner in which the touch panel is traced based on information acquired from the touch panel when the operation surface is being traced, and decides which one of the linear operation mode and the circular-arc operation mode based on the discriminated characteristics is the operation mode, and executes change processing that changes the one operation mode decided by the decision processing to the other operation mode in response to a change in the characteristic manner of tracing.

The change processing changes the one operation mode decided by the decision processing to the other operation mode in accordance with a change in the characteristic manner of tracing. Accordingly, in the display device provided with the above-described first feature, even after one of the operation modes has been decided as the operation mode, the operation mode can be changed to the other operation mode accordingly in response to the change of the characteristic manner of tracing. In other words, the characteristic manner in which the operation surface is traced is reflected in deciding the operation mode, so the operator only needs to perform an appropriate operation method each time, and therefore the operability of the touch panel can be improved. Also, the display device provided with the above-described first feature decides the operation mode as needed based on the characteristic manner in which the operation surface is traced, so it is not necessary for the operator to perform any operation mode change processing, and therefore this display device is convenient to operate.

According to a second feature of this display device, in the above-described first feature, the information includes a first velocity component indicating a velocity component in a first direction when the operation surface was traced, and a second velocity component indicating a velocity component in a second direction different from the first direction, the decision processing compares the first velocity component with the second velocity component, and based on the result of that comparison, decides which one of the linear operation mode and the circular-arc operation mode is the operation mode, and the change processing, when a plurality of histories of comparison results in the decision processing are stored and the newest histories tend to indicate an operation mode different than the operation mode decided in the decision processing, changes the one operation mode to the other operation mode.

The decision processing compares the first velocity component indicating the velocity component in the first direction when the operation surface was traced with the second velocity component indicating the velocity component in the second direction different from the first direction, and based on the result of that comparison, decides one of the linear operation mode and the circular-arc operation mode as the operation mode. The change processing, when the plurality of histories of comparison results in the decision processing are stored and the newest histories tend to indicate an operation mode different than the operation mode decided in the decision processing, changes the one operation mode to the other operation mode.

According to a third feature of this display device, in the above-described first feature, the information includes a first movement distance indicating a movement distance in a first direction by which the operation surface is traced, and a second movement distance indicating a movement distance in a second direction different from the first direction, the decision processing compares the first movement distance with the second movement distance, and based on the result of that comparison, decides one of the linear operation mode and the circular-arc operation mode as the operation mode, and the change processing, when a plurality of histories of comparison results in the decision processing are stored and the newest histories tend to indicated an operation mode different than the operation mode decided in the decision processing, changes the one operation mode to the other operation mode.

According to a fourth feature of this display device, in the above-described first feature, the information is a function based on a trajectory by which the operation surface is traced, the decision processing, based on the function, decides which one of the linear operation mode and the circular-arc operation mode is the operation mode, and the change processing, when a plurality of histories of comparison results in the decision processing are stored and the newest histories tend to indicate an operation mode different than the operation mode decided in the decision processing, changes the one operation mode to the other operation mode.

According to a fifth feature of this display device, in the decision processing, the linear operation mode is set as an initial setting, and in the change processing, the linear operation mode is changed to the circular-arc operation mode when the characteristic manner of tracing has changed.

According to a sixth feature of this display device, in any of the above-described second to fourth features, the change processing, when a consecutive number of the histories indicating the operation mode decided in the decision processing is less than a predetermined number of histories, changes the one operation mode to the other operation mode.

According to a seventh feature of this display device, in any of the above-described first to sixth features, in the linear operation mode, a vertical direction operation mode in which the image is changed by tracing the operation surface in a substantially vertical direction, and a horizontal direction operation mode in which the image is changed by tracing the operation surface in a substantially horizontal direction, are set, and the decision processing, when deciding the linear operation mode as the operation mode, based on the discriminated characteristics, further decides which one of the vertical direction operation mode and the horizontal direction operation mode is the operation mode.

According to an eighth feature of this display device, when a change amount of the image has reached a threshold value, limiting processing is executed to limit the change amount of the image when the operation surface was traced.

The limiting processing, when a change amount of the image has reached a threshold value, limits the change amount of the image when the operation surface was traced. Accordingly, in the display device provided with the above-described fifth feature, it is possible to prevent the image from greatly exceeding the threshold value when the operation surface is traced in a state in which the amount of change in the image has reached the threshold value. For example, it is assumed that the image is an image representing a knob adjusted by rotating the knob in a range from a minimum value to a maximum value, and the positions at which the image instructs the minimum value and the maximum value are close to each other. In such a case, it is possible to prevent rotation so as to short-cut to the position indicating the minimum value by tracing the operation surface when the image is indicating the maximum value, or alternatively, rotation so as to short-cut to the position indicating the maximum value by tracing the operation surface when the image is indicating the minimum value.

According to a ninth feature of this display device, the image is a rotatable image representing an operation member for adjusting a physical quantity, and is an image that displays an adjustment amount according to the rotational position of the image.

That is, with the display device provided with the above-described ninth feature, it is possible to improve operability for adjustment of a physical quantity. In particular, in a tenth feature of this display device, the operation member is a rotatable knob.

According to an eleventh feature, in each display device described above, a minimum value, a median value, and a maximum value of the rotation amount of the knob are displayed, and an instruction indicating the rotational position of the knob is configured not to move between the minimum value and the maximum value where the median value is not provided.

An image display method according to this disclosure is an image display method in a device provided with a touch panel, the image display method including: setting, as an operation mode for changing an image displayed on an operation surface of the touch panel by tracing the operation surface, a linear operation mode in which the image is changed by tracing the operation surface substantially along a straight line, and a circular-arc operation mode in which the image is changed by tracing the operation surface substantially along a circular arc; discriminating a characteristic manner in which the touch panel is traced based on information acquired from the touch panel when the operation surface is being traced, and deciding which one of the linear operation mode and the circular-arc operation mode based on the discriminated characteristics is the operation mode; and changing the one operation mode decided by the decision to the other operation mode when there is a change in the characteristic manner of tracing.

A non-transitory storage medium storing therein an image display program according to this disclosure causes a computer provided with a touch panel to execute: setting, as an operation mode for changing an image displayed on an operation surface of the touch panel by tracing the operation surface, a linear operation mode in which the image is changed by tracing the operation surface substantially along a straight line, and a circular-arc operation mode in which the image is changed by tracing the operation surface substantially along a circular arc; discriminating a characteristic manner in which the touch panel is traced based on information acquired from the touch panel when the operation surface is being traced, and deciding which one of the linear operation mode and the circular-arc operation mode based on the discriminated characteristics is the operation mode; and changing the one operation mode decided by the decision to the other operation mode when there is a change in the characteristic manner of tracing.

BRIEF DESCRIPTION OF DRAWINGS

FIG. 7A shows a state before tracing an operation surface 13$a$, and FIG. 7B shows a state after tracing the operation surface 13$a$;

FIG. 8A shows a state before tracing the operation surface 13$a$, and FIG. 8B shows a state after tracing the operation surface 13$a$; and FIGS. 9A to 9C illustrate a problem of a conventional former display device, where FIG. 9A shows a state before tracing the operation surface 13$a$ diagonally, FIG. 9B shows a state after tracing the operation surface 13$a$ diagonally, and FIG. 9C shows a rotation amount of a knob 13$d$.

DESCRIPTION OF EMBODIMENTS

Main Electrical Configuration of Display Device 10

Figure 1:
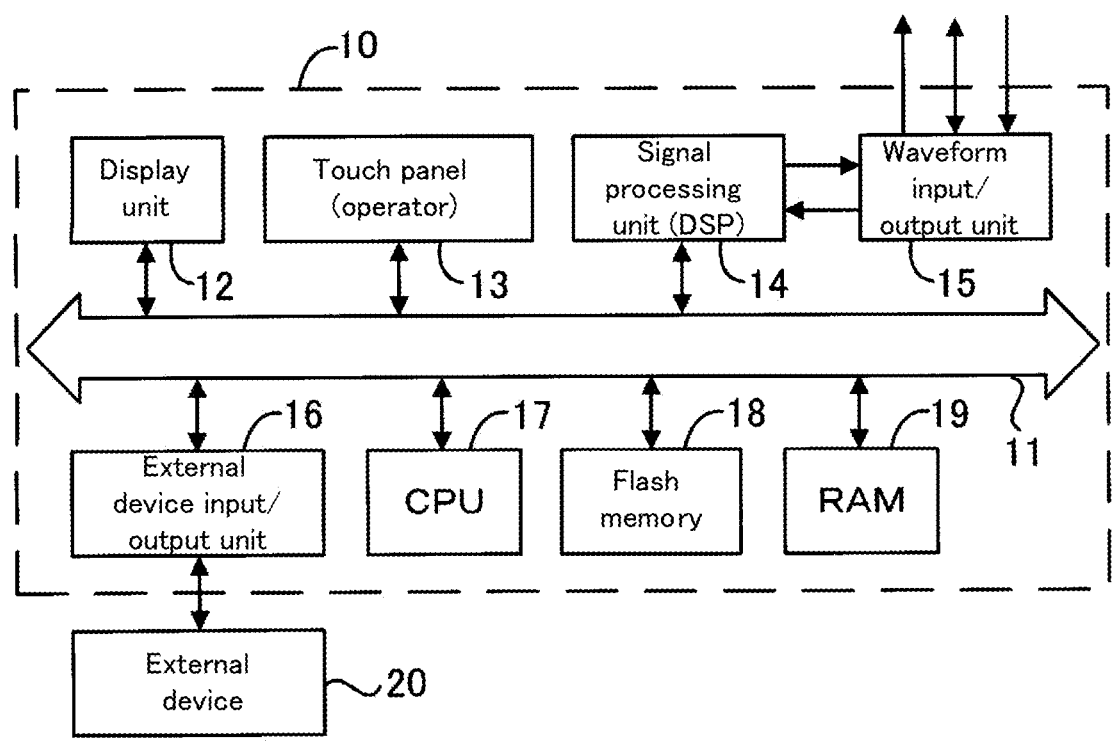
FIG. 1 shows, in blocks, a main electrical configuration of a display device 10 according to an embodiment of this disclosure.
Figure 6:
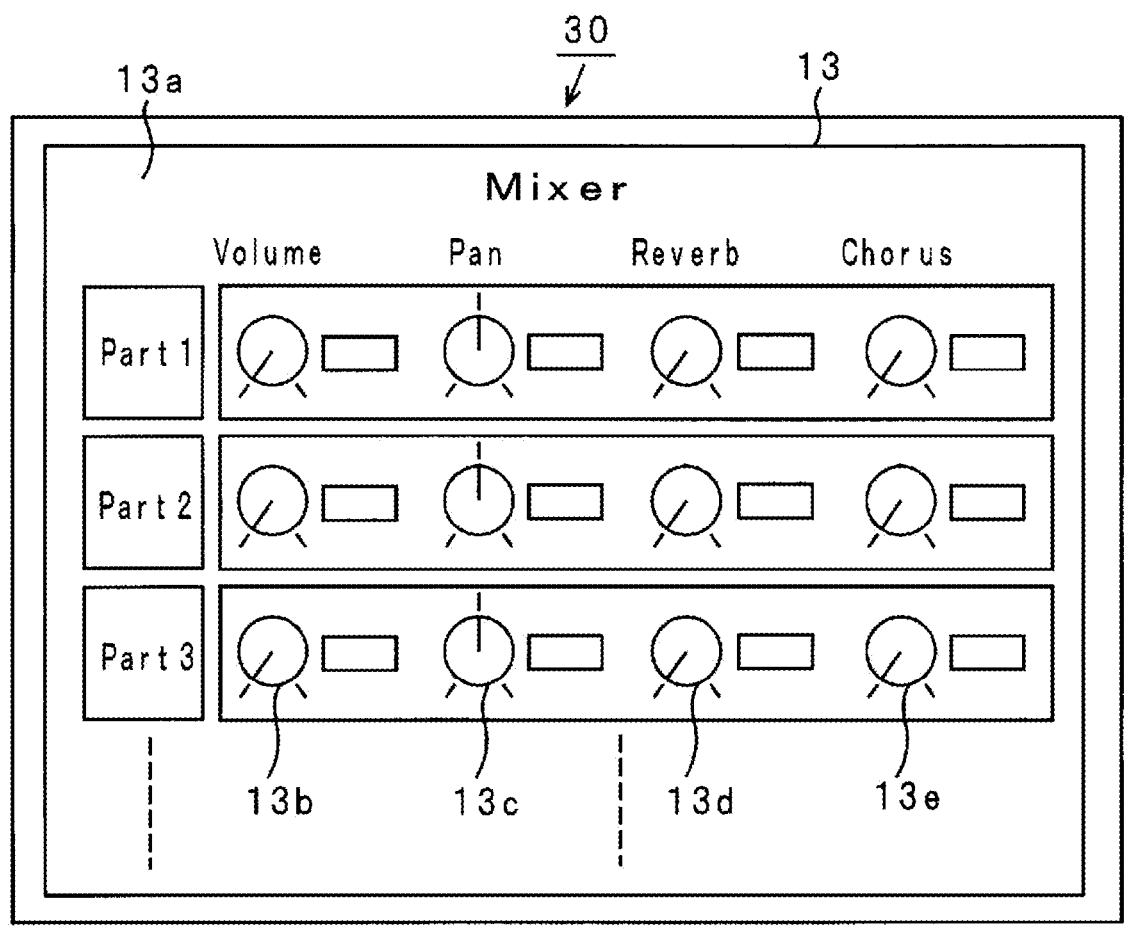
FIG. 6 shows a conventional display device 30.
Figure 7A:
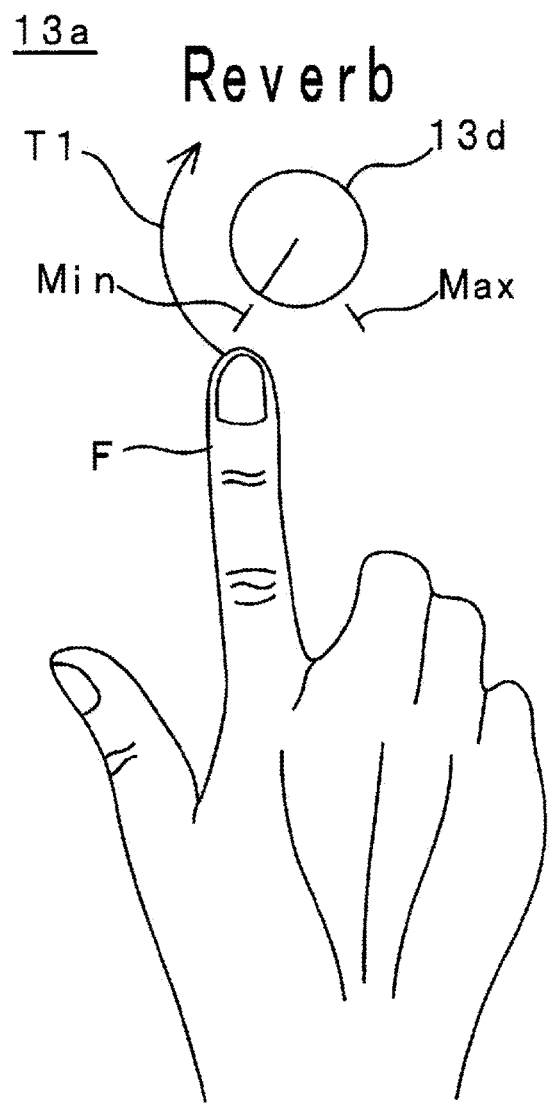
FIGS. 7A and 7B show a rotary operation mode, where
Figure 7B:
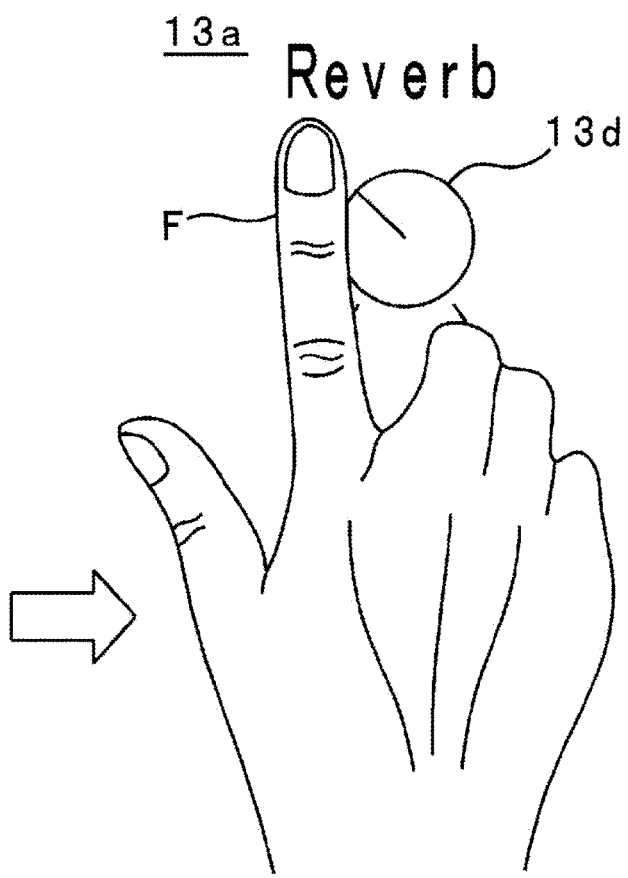
Figure 8A:
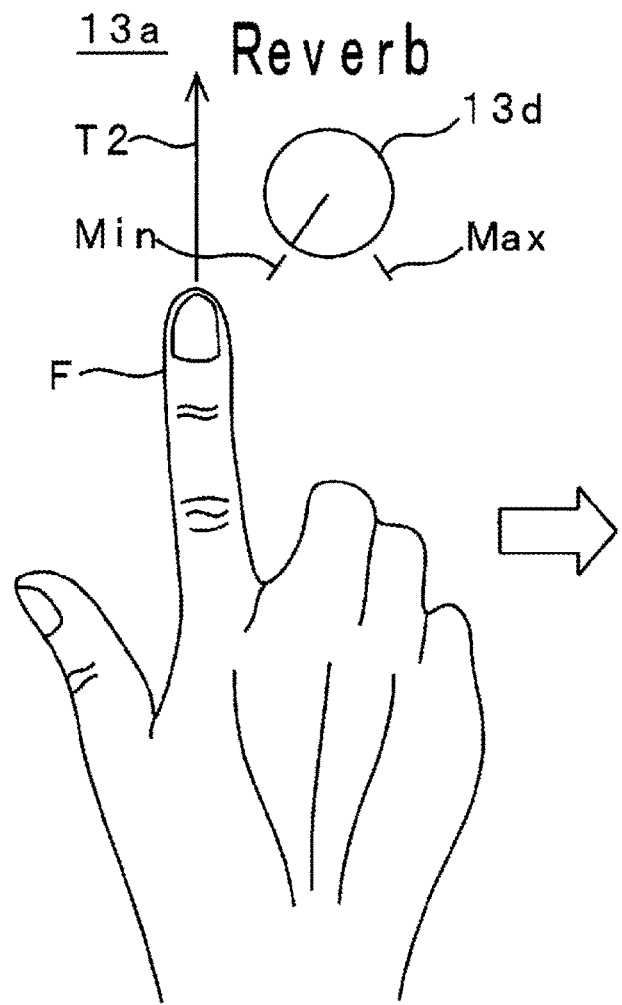
FIGS. 8A and 8B show a linear operation mode, where
Figure 8B:
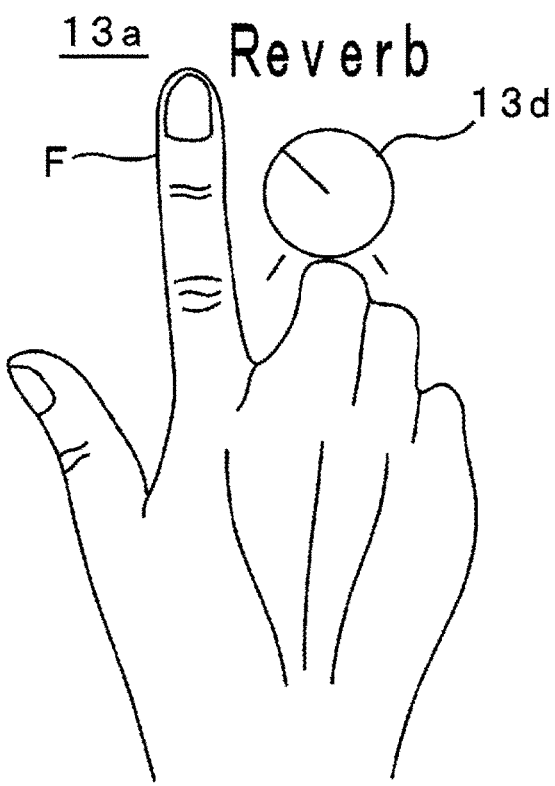

The main electrical configuration of a display device 10 according to an embodiment of this disclosure will be described with reference to FIG. 1, where this configuration is shown in blocks. In this embodiment, a case where the display device 10 functions as a digital mixer will be described. Note that the same reference numerals are used for the same configuration elements as in the conventional display device 30 shown in FIG. 6.

The display device 10 includes a display unit 12, a touch panel 13, a signal processing unit 14, a waveform input/output unit 15, an external device input/output unit 16, a CPU (processor) 17, a flash memory 18, and a RAM 19, and these are electrically coupled by a system bus 11. The display device 10 has a function of performing various signal processing on audio signals input from a plurality of input channels and outputting them from a plurality of output channels. Note that a control unit according to the present disclosure is configured with the CPU 17, the flash memory 18, the RAM 19, and the like.

The display device 12 is configured with a flat plate type liquid crystal display device. Also, the display device 12 is formed in a size capable of displaying a graphical user interface (GUI). Here, the graphical user interface is an interface for performing adjustment or the like of the values of parameters used in the digital mixer. The touch panel 13 is a capacitance type touch panel and is layered on the surface of the display unit 12. The touch panel 13 includes a protective film (not shown) having an operation surface 13$a$ on its surface, and an electrode (not shown) disposed under the protective film. The electrode is configured from a plurality of transparent electrodes extending in the horizontal direction (the x axis direction), and a plurality of transparent electrodes orthogonal to these respective transparent electrodes and extending in the vertical direction (the y axis direction). An intersection of respective transparent electrodes constitutes x-y coordinates, and the touch panel 13 outputs x-y coordinate data corresponding to a trajectory when the operation surface 13$a$ was traced. Also, each electrode is transparent, so the image of the display device 12 passes through each electrode and is displayed on the operation surface 13$a$. Note that the display device 12 can also be configured with an organic EL panel.

The CPU 17 supervises control of the display device 10. Also, the CPU 17 acquires the x-y coordinate data output from the touch panel 13. Then, the CPU 17 calculates a velocity component in the x axis direction and a velocity component in the y axis direction based on, among the acquired x-y coordinate data, the x-y coordinates of a start position and an end position when the operation surface 13$a$ was traced, and a required time from the start position to the end position. The technique of performing this calculation will be described later. Also, the CPU 17 adjusts various parameters set in the digital mixer based on the x-y coordinate data output from the touch panel 13, and the like.

The flash memory 18 rewritably stores various computer programs executed by the CPU 17, and the CPU 17 reads and executes a computer program from the flash memory 18 as necessary. The RAM 19 temporarily stores processing results and calculation results of the CPU 17, and also functions as a work memory when the CPU 17 executes a computer program. The waveform input/output unit 15 is an interface for receiving input of an audio signal to be processed by the signal processing unit 14, and outputting an audio signal that has been processed. The signal processing unit 14 includes a digital signal processor (DSP), performs various signal processing such as mixing and equalization on an audio signal input from the waveform input/output unit 15, and outputs the processed audio signal to the waveform input/output unit. The external device input/output unit 16 is an interface for inputting/outputting data to/from an external device such as another display device, a pointing device such as a mouse, a keyboard for inputting characters, an operation panel, or the like.

Determination of Operation Mode

Figure 2:
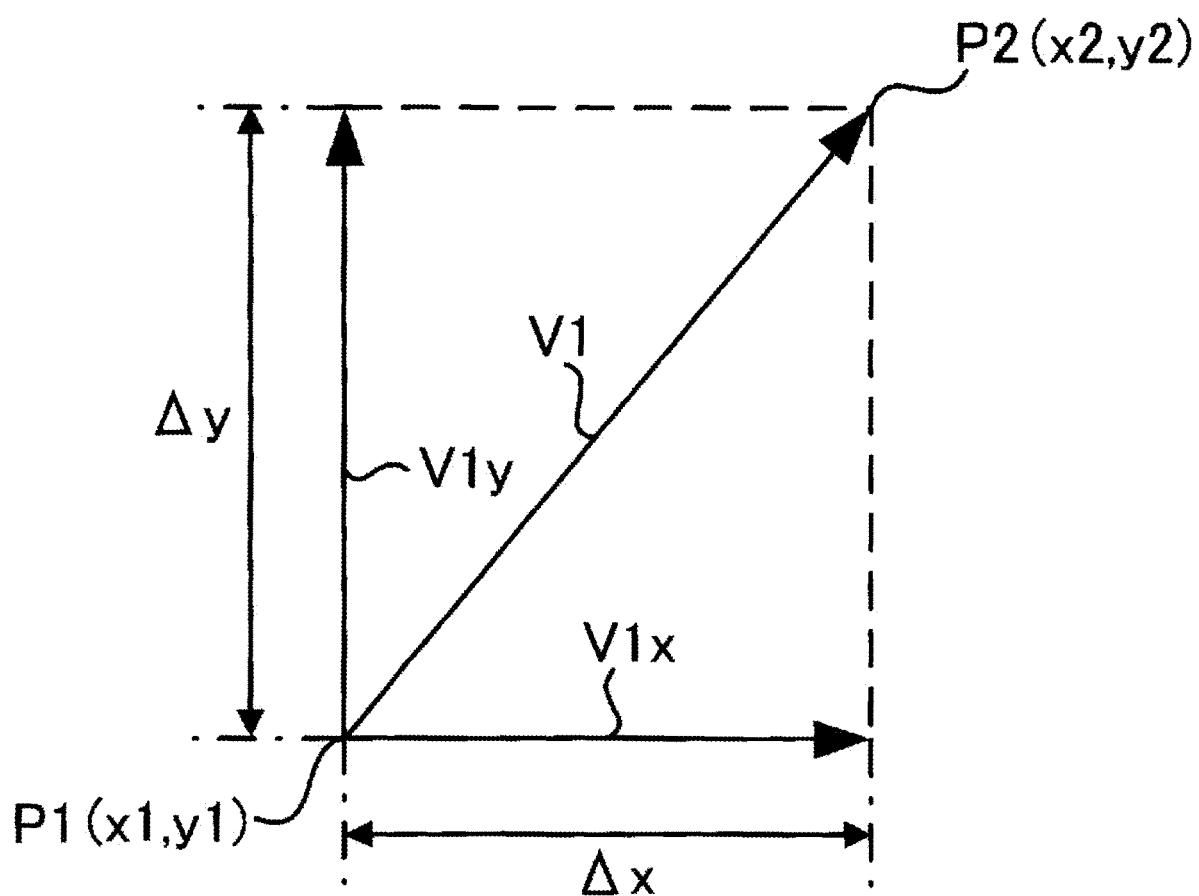
FIG. 2 shows a velocity component V1$x$ in an x axis direction and a velocity component V1$y$ in a y axis direction.
Figure 3:
FIG. 3 shows a history table 18$a$.

Next, a method for determining the operation mode for the operation surface 13a (FIG. 6) of the touch panel 13 will be described with reference to FIGS. 2 and 3. FIG. 2 shows a velocity component $V1x$ in the x axis direction and a velocity component $V1y$ in the y axis direction. FIG. 3 shows a history table 18a.

The CPU 17 (FIG. 1) acquires the x-y coordinate data from the touch panel 13, and based on the acquired x-y coordinate data, calculates the velocity component $V1x$ in the x axis direction and the velocity component $V1y$ in the y axis direction when the operation surface 13a was traced. For example, as shown in FIG. 2, it is assumed that an area from a point P1 (x1, y1) to a point P2 (x2, y2) was traced substantially along a straight line. At this time, a movement distance $\Delta x$ in the x axis direction when reaching the point P2 from the point P1 is obtained by calculating (x2−x1), and a movement distance $\Delta y$ in the y axis direction is obtained by calculating (y2−y1). Also, assuming that the velocity from the point P1 until reaching the point P2 is V1, and the required time is $\Delta t$ seconds, the velocity component $V1x$ in the x axis direction (the horizontal direction) is obtained by calculating ($\Delta x/\Delta t$), and the velocity component $V1y$ in the y axis direction (the vertical direction) is obtained by calculating ($\Delta y/\Delta t$).

The display device 10 of this embodiment is characterized in that, even in a case where the operation mode is set to the linear operation mode in the vertical direction or the linear operation mode in the horizontal direction, it is possible to automatically switch to the rotary operation mode in a case where characteristic operation (the characteristic manner of tracing) has changed to a tendency for the rotary operation mode during operation. In order to realize this, the CPU 17 extracts the characteristic manner in which an operator traces the operation surface 13a as needed based on the calculated velocity components. When the velocity component in the x axis direction is considerably larger than the velocity component in the y axis direction, the CPU 17 estimates that the operator traced the operation surface 13a in the x axis direction, that is, in the horizontal direction, and when the velocity component in the y axis direction is considerably larger than the velocity component in the x axis direction, the CPU 17 estimates that the operator traced the operation surface 13a in the y axis direction, that is, in the vertical direction. In this embodiment, when determined that the velocity component $V1y$ in the y axis direction is three times larger than the velocity component $V1x$ in the x axis direction, the CPU 17 estimates that the operator is tracing the operation surface 13a in the vertical direction, and sets the operation mode to the linear operation mode in the vertical direction. Also, when determined that the velocity component $V1x$ in the x axis direction is three times larger than the velocity component $V1y$ in the y axis direction, the CPU 17 estimates that the operator is tracing the operation surface 13a in the horizontal direction, and sets the operation mode to the linear operation mode in the horizontal direction.

Also, when determined that the velocity component $V1x$ in the x axis direction is larger than the velocity component $V1y$ in the y axis direction when the operation mode is set to the linear operation mode in the vertical direction, or alternatively, when determined that the velocity component $V1y$ in the y axis direction is larger than the velocity component $V1x$ in the x axis direction when the operation mode is set to the linear operation mode in the horizontal direction, the CPU 17 sets the operation mode to the rotary operation mode.

In order to determine the manner of tracing by the operator whenever needed, the CPU 17 stores, in the history table 18a (FIG. 3) of the flash memory 18 (FIG. 1), histories of determination that the velocity component $V1y$ in the y axis direction is larger than the velocity component $V1x$ in the x axis direction, and histories of determination that the velocity component $V1x$ in the x axis direction is larger than the velocity component $V1y$ in the y axis direction.

As shown in FIG. 3, histories of determination that the velocity component $V1x$ in the x axis direction is larger than the velocity component $V1y$ in the y axis direction ($V1x>V1y$), and histories of determination that the velocity component $V1y$ in the y axis direction is larger than the velocity component $V1x$ in the x axis direction ($V1y>V1x$), are stored in the history table 18a. In FIG. 3, a time t1 is the oldest history, and a time t7 is the newest history. In the history table 18a, histories of a total of seven times from t1 to t7 are stored, and whenever a newest history is stored at the time t7, each history is updated so as to be shifted later one by one. In the example shown, histories of determination that $V1x>V1y$ are stored five times from the newest time t7 to the past time t3. That is, the example shows that the number of consecutive newest determinations that $V1x>V1y$ is three or more. Note that the time span from the time t1 to the time t7 can be appropriately set, and for example, the time span between each time can be set to about 0.5 seconds.

When determined that the velocity component $V1y$ in the y axis direction is three times larger than the velocity component $V1x$ in the x axis direction, the CPU 17 estimates that the operator performed an operation while intending to do in the linear operation mode in the vertical direction, and sets the operation mode to the linear operation mode in the vertical direction. In this state, referring to the history table 18a, when the newest histories of determining that the velocity component $V1x$ in the x axis direction is larger than the velocity component $V1y$ in the y axis direction ($V1x>V1y$) are stored three or more consecutive times, the operation mode is changed to the rotary operation mode.

Also, when determined that the velocity component $V1y$ in the x axis direction is three times larger than the velocity component $V1y$ in the y axis direction, the CPU 17 estimates that the operator performed an operation while aware of the linear operation mode in the horizontal direction, and sets the operation mode to the linear operation mode in the horizontal direction. In this state, referring to the history table 18a, when newest histories of determining that the velocity component V1y in the y axis direction is larger than the velocity component V1x in the x axis direction (V1y>V1x) are stored three or more consecutive times, the operation mode is changed to the rotary operation mode.

As described above, in the history table 18a, the CPU 17 stores histories of the characteristic manner in which the operation surface 13a is traced based on the x-y coordinate data acquired from the touch panel 13 or the like, and in order to reflect the stored histories in processing, the operator can change the operation mode as needed to perform an operation.

Flow of Operation Mode Decision

Figure 4:
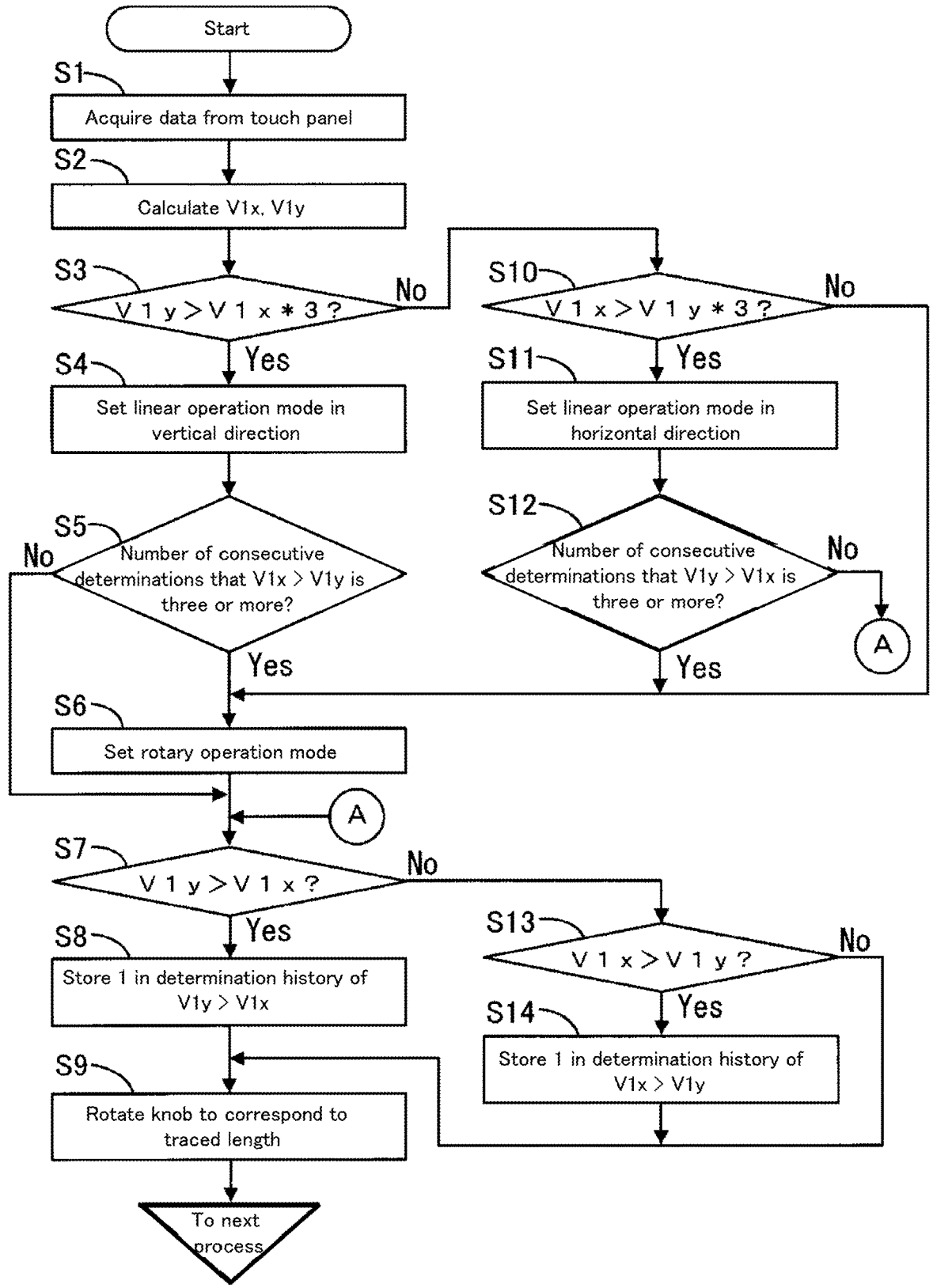
FIG. 4 is a flowchart showing a flow of processing executed by a CPU 17 to decide an operation mode.

Next, the flow of processing executed by the CPU 17 to decide the operation mode will be described with reference to a flowchart in FIG. 4 showing this flow of processing. Here, a case where the knob 13d (FIG. 6) is rotated will be described.

The CPU 17 acquires x-y coordinate data or the like from the touch panel 13 (Step (hereinafter abbreviated as S) 1), and calculates the velocity component V1x in the x axis direction and the velocity component V1y in the y axis direction based on the acquired x-y coordinate data (S2). Next, the CPU 17 determines whether or not the velocity component V1y in the y axis direction is three times larger than the velocity component V1x in the x axis direction (S3), and when determined that the velocity component V1y is three times larger (S3: Yes), the operation mode is set to the linear operation mode in the vertical direction (S4). Next, the CPU 17 refers to the history table 18a and determines whether or not the number of consecutive newest determinations that V1x>V1y is three or more (S5). When determined that the number is three or more (S5: Yes), the operation mode is changed to the rotary operation mode (S6). That is, by referring to the history table 18a, the CPU 17 acquires a tendency of the manner of tracing in the immediate vicinity of the operation surface 13a, and when the acquired tendency indicates a rotary operation mode different from the linear operation mode in the vertical direction that is currently set, the linear operation mode in the vertical direction that was set in S4 is changed to the rotary operation mode. Also, in S5, when determined that the number of consecutive newest determinations that V1x>V1y is not three or more (S5: No), the CPU 17 maintains the linear operation mode in the vertical direction that was set in S4.

When the CPU 17 determines in S3 that the velocity component V1y in the y axis direction is not three times larger than the velocity component V1x in the x axis direction (S3: No), the CPU 17 determines whether or not the velocity component V1x in the x axis direction is three times larger than the velocity component V1y in the y axis direction (S10). Here, when an affirmative determination is made (S10: Yes), the operation mode is set to the linear operation mode in the horizontal direction (S11). Then, the CPU 17 refers to the history table 18a and determines whether or not the number of consecutive newest determinations that V1y>V1x is three or more (S12). When determined that the number is three or more (S12: Yes), the operation mode is changed to the rotary operation mode (S6). That is, by referring to the history table 18a, the CPU 17 acquires the tendency of the manner of tracing in the immediate vicinity of the operation surface 13a, and when the acquired tendency indicates the rotary operation mode different from the linear operation mode in the horizontal direction that is currently set, the linear operation mode in the horizontal direction that was set in S11 is changed to the rotary operation mode. Also, in S12, when determined that the number of consecutive newest determinations that V1y>V1x is not three or more (S12: No), the CPU 17 maintains the linear operation mode in the horizontal direction that was set in S11.

When any of the operation modes is set or changed (S4, S11, or S6), the CPU 17 determines whether or not the velocity component V1y in the y axis direction is larger than the velocity component V1x in the x axis direction based on the calculation result of S2 (S7). When determined that the velocity component V1y in the y axis direction is larger (S7: Yes), a determination number 1 is stored at the newest time t7 of V1y>V1x in the history table 18a (FIG. 3) (S8). When the CPU 17 determines in S7 that the velocity component V1y in the y axis direction is not larger than the velocity component V1x in the x axis direction (S7: No), the CPU 17 determines whether or not the velocity component V1x in the x axis direction is larger than the velocity component V1y in the y axis direction (S13), and when determined that the velocity component V1x in the x axis direction is larger (S13: Yes), a determination number 1 is stored at the newest time t7 of V1x>V1y in the history table 18a (FIG. 3) (S14). Then, the CPU 17 rotates the knob 13d (FIG. 6) so as to correspond to the length that the operator traced the operation surface 13a(S9).

For example, in the case of the rotary operation mode, an approximate center angle is calculated from the trajectory of the circular arc traced by the operator, and the knob 13d is rotated by an angle corresponding to that center angle. On the other hand, in the case of the linear operation mode, a ratio with respect to the diameter of the knob 13d is calculated from the linear trajectory traced by the operator. Also, when the trajectory has a length corresponding to the diameter of the knob 13d, the knob 13d is rotated by an angle of 90 degrees. However, these are merely examples of setting the rotation angle of the knob 13d, and other settings can also be set.

Effects of First Embodiment

As described above, the display device 10 according to the first embodiment, even when the operation mode has been decided as one of the operation modes, when the characteristic manner of tracing has changed, it is possible to change to the other operation mode according to the change in characteristics. In other words, the characteristic manner in which the operation surface 13a is traced is reflected in deciding the operation mode as needed, so the operator only needs to perform an appropriate operation method each time, and therefore the operability of the touch panel 13 can be improved. Also, the display device 10 of the first embodiment decides the operation mode as needed based on the characteristic manner in which the operation surface 13a is traced, so it is not necessary for the operator to perform operation mode change processing, and therefore this display device 10 does not take time and effort.

Second Embodiment

Figure 5:
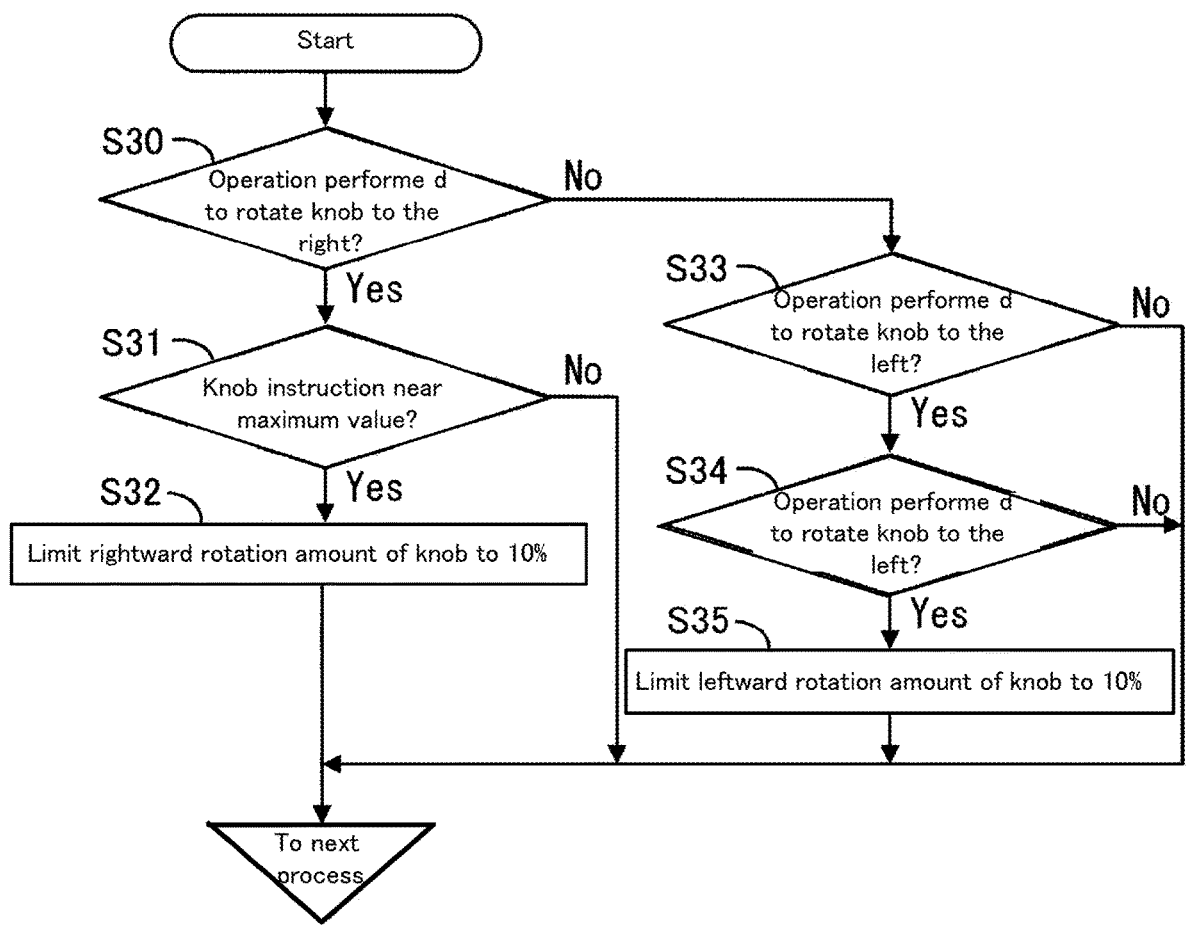
FIG. 5 is a flowchart showing a flow of processing executed by the CPU 17 in a second embodiment.

Next, a second embodiment of this disclosure will be described with reference to FIG. 5. FIG. 5 is a flowchart showing the flow of processing executed by the CPU 17. The display device 10 of this embodiment is characterized in that it is possible to prevent excessive rotation of a knob. The display device 10 of this embodiment has the same configuration and functions as the display device 10 of the first embodiment, except for the processing of FIG. 5 executed by the CPU 17, so below a description of the same portions is omitted, and the same reference numerals are used for the same configuration elements.

Based on the x-y coordinate data acquired from the touch panel 13 and the like, the CPU 17 determines whether or not an operation of turning the knob (FIG. 6) to the right has been performed on the operation surface 13a (S30). Here, when an affirmative determination is made (S30: Yes), the CPU 17 determines whether or not an instruction G of the knob that is the target of that operation is close to the maximum value (S31). For example, actually, a reverb adjustment value is not displayed on the periphery of the knob 13d, but as shown in FIG. 9C, in a case where a minimum value (Min) of the reverb intensity is set to 0, a maximum value (Max) is set to 100, a median value between the minimum value 0 and the maximum value 100 is set to a median value 50, and an intermediate value 75 between the median value 50 and the maximum value 100 is set as a threshold value, the CPU 17 determines whether or not the instruction G of the knob 13d is rotated to the side of the maximum value 100 relative to the intermediate value 75 serving as a threshold value. Here, when determined that the knob instruction G is close to the maximum value (S31: Yes), the CPU 17 limits the rightward rotation amount of the knob to 10% of the maximum rotation amount (S32).

For example, in FIG. 9C, the rotation angle from the minimum value 0 to the median value 50 of the knob 13d is 140 degrees, the rotation angle from the minimum value 0 to the intermediate value 75 is 210 degrees, the rotation angle from the minimum value 0 to the maximum value 100 is 280 degrees, and the rotation angle necessary for short-cutting from the maximum value 100 to the minimum value 0 by right rotation is 80 degrees. In a state where the rotation amount (instruction G) of the knob 13d is instructing the intermediate value 75, that is, when the knob 13d is rotated to the right by 210 degrees, control is performed so as to not then rotate to the right by 36 degrees or more, which is 10% of the 360 degrees necessary for one rotation, regardless of the length that was traced. In this example, if the knob 13d is then rotated to the right by 36 degrees from the 210 degrees that instructs the intermediate value 75, the knob 13d only rotates to the right to 246 degrees, and therefore does not reach the maximum value of 280 degrees. Also, even in a state where the knob 13d is instructing the maximum value 100, that is, even when the knob 13d is rotated to the right by 280 degrees, if the knob 13d is then rotated to the right 36 degrees from that position, the knob 13d only rotates to the right to 316 degrees, and therefore does not reach the minimum value of 360 degrees. In this manner, by executing S32, it is possible to prevent a situation where the knob rotates excessively when the knob rotates to the right, and moves in a short-cut manner from the maximum value to the minimum value. Also, it is possible to prevent the instruction G of the knob 13d from rotating beyond the maximum value 100, that is, it is possible to prevent the instruction G of the knob 13d from moving from the maximum value 100 to between the maximum value 100 and the minimum value 0.

Also, when a negative determination is made in S30 (S30: No), the CPU 17 determines whether or not an operation of turning the knob (FIG. 6) to the left has been performed on the operation surface 13a (S33). Here, when an affirmative determination is made (S33: Yes), the CPU 17 determines whether or not the instruction G of the knob that is the target of that operation is close to the minimum value (S34). For example, as shown in FIG. 9C, in a case where a median value between the minimum value 0 and the maximum value 100 is set to a median value 50, and an intermediate value 25 between the minimum value 0 and the median value 50 is set as a threshold value, the CPU 17 determines whether or not the instruction G of the knob 13d is rotated to the side of the minimum value 0 relative to the intermediate value 25 serving as a threshold value. Here, when determined that the knob instruction G is close to the minimum value (S34: Yes), the CPU 17 limits the leftward rotation amount of the knob to 10% of the maximum rotation amount (S35).

For example, in FIG. 9C, the rotation angle from the minimum value 0 to the intermediate value 25 of the knob 13d is 70 degrees, and the rotation angle necessary for short-cutting from the minimum value 0 to the maximum value 100 by left rotation is 80 degrees. In a state where the rotation amount (instruction G) of the knob 13d is instructing the intermediate value 25, that is, when the knob 13d is rotated to the right by 70 degrees, control is performed so as to not then rotate to the left by 36 degrees or more, which is 10% of the 360 degrees necessary for one rotation, regardless of the length that was traced. In this example, if the knob 13d is then rotated to the left by 36 degrees from the 70 degrees that instructs the intermediate value 25, the knob 13d only rotates to the right to 34 degrees, and therefore does not reach the minimum value of 0 degrees. Also, even in a state where the knob 13d is instructing the minimum value 0, that is, even when the knob 13d is not rotated to the right, if the knob 13d is then rotated to the left 36 degrees from that position, the knob 13d only rotates to the left to 324 degrees (=360 degrees−36 degrees), and therefore does not reach the maximum value of 280 degrees. In this manner, by executing S35, it is possible to prevent a situation where the knob rotates excessively when the knob rotates to the left, and moves in a short-cut manner from the minimum value to the maximum value. Also, it is possible to prevent the instruction G of the knob 13d from rotating beyond the minimum value 0, that is, it is possible to prevent the instruction G of the knob 13d from moving from the minimum value 0 to between the minimum value 0 and the maximum value 100.

Effects of Second Embodiment

As described above, in the display device 10 of the second embodiment, it is possible to limit the amount of change in an image when the operation surface 13a is traced in a state where the amount of change in the image has reached a predetermined threshold value. Therefore, the display device 10 can prevent the image from greatly exceeding the predetermined threshold value when the operation surface 13a is traced in a state where the amount of change in the image has reached the predetermined threshold value.

Other Embodiments (1) The CPU 17 can extract the characteristic manner of tracing based on the x-y coordinate data acquired from the touch panel 13, and decide the operation mode based on the extracted characteristics. For example, the movement distance Δx in the x axis direction and the movement distance Δy in the y axis direction are calculated based on the x-y coordinates of a start position when tracing and the x-y coordinates of an end position where the tracing ended, and when a ratio of Δx and Δy is within a predetermined range, the rotary operation mode is decided, and when that ratio is outside the predetermined range, the linear operation mode is decided. For example, when the value of Δx/Δy is in a range of 0.5 to 2.0, the slope of the traced trajectory is not too large and not too small, so it is estimated that this is a trajectory traced in a circular arc. When newest histories of determination that the value of Δx/Δy is within the range of 0.5 to 2.0 have been stored three times or more consecutively in the history table, the operation mode is decided to be the rotary operation mode. Also, when the value of Δx/Δy exceeds 3, the slope of the traced trajectory is too large, so it is estimated that the trajectory is a trajectory traced with awareness of the vertical direction, and the operation mode is decided to be the linear operation mode in the vertical direction. Also, when the value of Δx/Δy is less than 0.3, the slope of the traced trajectory is too small, so it is estimated that the trajectory is a trajectory traced with awareness of the horizontal directions, and the operation mode is decided to be the linear operation mode in the horizonal direction. Note that, as a method of determining whether to maintain the operation mode in the linear operation mode or change to the rotary operation mode, for example, it is possible to refer to the histories as in the above embodiment. This point is the same in (2) below.

(2) Also, the CPU 17 can calculate a traced trajectory function based on the x-y coordinate data acquired from the touch panel 13, and decide the operation mode based on the calculation result. For example, the CPU 17 determines whether or not the trajectory function is a quadratic function, that is, whether or not the trajectory is a circular arc trajectory, and stores the determination result as a history in the history table. When newest histories of determination that the trajectory is a circular arc trajectory are stored three times or more consecutively in the history table, the operation mode is decided to be the rotary operation mode. Also, when the calculated function is a linear function and the slope of the function is large, the CPU 17 estimates that the operation was performed with awareness of the vertical direction, and the operation mode is decided to be the linear operation mode in the vertical direction. When the calculated function is a linear function and the slope of the function is small, the CPU 17 estimates that the operation was performed with awareness of the horizontal direction, and the operation mode is decided to be the linear operation mode in the horizontal direction.

(3) In each of the above-described embodiments, as a display device according to the present application, a case is described where an image for adjusting various physical quantities (parameters) such as volume, a pan pot, and the like is displayed when performing music production, but the display device according to the present application is also applicable to adjustment of other physical quantities. For example, the display device according to the present application is also applicable to a display device provided in a vehicle. For example, the display device according to the present application is also applicable to a display device that displays an operation surface for setting the volume, sound quality, and the like of in-vehicle audio. In this case, a knob for adjusting the volume or the sound quality is displayed on an operation surface, and by tracing the operation surface, the knob is rotated to adjust the volume or the sound quality. The characteristic manner of tracing by an operator is reflected in rotation of the knob, so it is possible to improve operability.

(4) Furthermore, the display device according to the present application is also applicable to a game in which an image displayed on an operation surface of a touch panel is changed by tracing the operation surface. In this case, the characteristic manner in which the operation surface is traced by an operator is reflected in movement of the image, so it is possible to improve operability.

(5) Furthermore, the display device according to the present application is also applicable to a computer that executes predetermined processing by changing an image displayed on an operation surface of a touch panel. In this case, the characteristic manner in which the operation surface is traced by an operator is reflected in movement of the image, so it is possible to improve operability.

(6) In each of the embodiments described above, the CPU 17 refers to the history table 18a, and the threshold value when determining the number of consecutive newest determinations is three times, but the threshold value can be set to two times, or can be set to four or more times. Also, rather than the number of consecutive newest determinations, it is possible to set the total number of past determinations as the threshold value. Note that the judgment when changing the operation mode can be appropriately set through a technique other than referring to the history table.

(7) Processing executed by the CPU 17 in each of the above-described embodiments may be executed by a CPU included in the signal processing unit 14, or may be executed by a computer serving as the external device 20.

(8) In the above-described embodiments, an example is given where the operation mode is changed from the linear operation mode to the rotary operation mode during touch operation, but the operation mode can be changed from the rotary operation mode to the linear operation mode in a similar manner.

Relationship to Claims

The knobs 13b to 13e correspond to a predetermined image according to claim 1. S1 to S4, S10, and S11 executed by the CPU 17 correspond to decision processing according to claim 1, and S5 to S8, and S12 to S14 correspond to change processing. The linear operation mode corresponds to a linear operation mode according to claim 1, and the rotary operation mode corresponds to a circular-arc operation mode according to claim 1. The linear operation mode in the vertical direction corresponds to a vertical direction operation mode according to claim 4, and the linear operation mode in the horizontal direction corresponds to a horizontal direction operation mode according to claim 4. S32 and S35 executed by the CPU 17 in the second embodiment correspond to limiting processing according to claim 8. Furthermore, the x axis direction corresponds to a first direction according to the third embodiment, the y axis direction corresponds to a second direction, the velocity component V1x in the x axis direction corresponds to a first velocity component, and the velocity component V1y in the y axis direction corresponds to a second velocity component. The volume adjusted by the knob 13b, the pan pot adjusted by the knob 13c, the reverb adjusted by the knob 13d, the chorus adjusted by the knob 13e, and the like correspond to predetermined physical quantities according to claim 9. Also, the knobs 13b to 13e correspond to an operation member according to claim 9.

LIST OF REFERENCE NUMERALS

10 Display device
12 Display unit
13 Touch panel
13a Operation surface
13b to 13e Knobs
18a History table

The invention claimed is:

1. A display device, comprising:
a touch panel; and
a control unit,
wherein
the control unit sets, as an operation mode for changing an image displayed on an operation surface of the touch panel by tracing the operation surface, a linear operation mode in which the image is changed by tracing the operation surface substantially along a straight line, and a circular-arc operation mode in which the image is changed by tracing the operation surface substantially along a circular arc,
the control unit executes decision processing that discriminates a characteristic manner in which the touch panel is traced based on information acquired from the touch panel when the operation surface is being traced, and decides which one of the linear operation mode and the circular-arc operation mode based on the discriminated characteristics is the operation mode,
the control unit executes change processing that changes the one operation mode decided by the decision processing to the other operation mode in response to a change in the characteristic manner of tracing,
the information acquired from the touch panel includes a first velocity component indicating a velocity component in a first direction when the operation surface was traced, and a second velocity component indicating a velocity component in a second direction different from the first direction,
in the decision processing the control unit compares the first velocity component with the second velocity component, and based on the result of that comparison, decides which one of the linear operation mode and the circular-arc operation mode is the operation mode, and
in the change processing, when a plurality of histories of comparison results in the decision processing are stored and the newest histories tend to indicate an operation mode different than the operation mode decided in the decision processing, the control unit changes the one operation mode to the other operation mode.

2. The display device according to claim 1,
wherein the information is a function based on a trajectory by which the operation surface is traced,
the decision processing, based on the function, decides which one of the linear operation mode and the circular-arc operation mode is the operation mode, and
the change processing, when a plurality of histories of comparison results in the decision processing are stored and the newest histories tend to indicate an operation mode different than the operation mode decided in the decision processing, changes the one operation mode to the other operation mode.

3. The display device according to claim 1,
wherein in the decision processing, the linear operation mode is set as an initial setting, and
in the change processing, the linear operation mode is changed to the circular-arc operation mode when the characteristic manner of tracing has changed.

4. The display device according to claim 1,
wherein the change processing, when a consecutive number of the histories indicating the operation mode decided in the decision processing is less than a predetermined number of histories, changes the one operation mode to the other operation mode.

5. The display device according to claim 1,
wherein in the linear operation mode, a vertical direction operation mode in which the image is changed by tracing the operation surface in a substantially vertical direction, and a horizontal direction operation mode in which the image is changed by tracing the operation surface in a substantially horizontal direction, are set, and
the decision processing, when deciding the linear operation mode as the operation mode, based on the discriminated characteristics, further decides which one of the vertical direction operation mode and the horizontal direction operation mode is the operation mode.

6. The display device according to claim 1,
wherein when a change amount of the image has reached a threshold value, limiting processing is executed to limit the change amount of the image when the operation surface was traced.

7. The display device according to claim 1,
wherein the image is a rotatable image representing an operation member for adjusting a physical quantity, and is an image that displays an adjustment amount according to the rotational position of the image.

8. The display device according to claim 7,
wherein the operation member is a rotatable knob.

9. The display device according to claim 8,
wherein a minimum value, a median value, and a maximum value of the rotation amount of the knob are displayed, and
an instruction indicating the rotational position of the knob is configured not to move between the minimum value and the maximum value where the median value is not provided.

10. A display device, comprising:
a touch panel; and
a control unit,
wherein
the control unit sets, as an operation mode for changing an image displayed on an operation surface of the touch panel by tracing the operation surface, a linear operation mode in which the image is changed by tracing the operation surface substantially along a straight line, and a circular-arc operation mode in which the image is changed by tracing the operation surface substantially along a circular arc,
the control unit executes decision processing that discriminates a characteristic manner in which the touch panel is traced based on information acquired from the touch panel when the operation surface is being traced, and decides which one of the linear operation mode and the circular-arc operation mode based on the discriminated characteristics is the operation mode,
the control unit executes change processing that changes the one operation mode decided by the decision processing to the other operation mode in response to a change in the characteristic manner of tracing,
the information includes a first movement distance indicating a movement distance in a first direction by which the operation surface is traced, and a second movement distance indicating a movement distance in a second direction different from the first direction, the decision processing compares the first movement distance with the second movement distance, and based on the result of that comparison, decides one of the linear operation mode and the circular-arc operation mode as the operation mode, and the change processing, when a plurality of histories of comparison results in the decision processing are stored and the newest histories tend to indicate an operation mode different than the operation mode decided in the decision processing, changes the one operation mode to the other operation mode.

11. The display device according to claim 10,
wherein the information is a function based on a trajectory by which the operation surface is traced,
the decision processing, based on the function, decides which one of the linear operation mode and the circular-arc operation mode is the operation mode, and
the change processing, when a plurality of histories of comparison results in the decision processing are stored and the newest histories tend to indicate an operation mode different than the operation mode decided in the decision processing, changes the one operation mode to the other operation mode.

12. The display device according to claim 10,
wherein in the decision processing, the linear operation mode is set as an initial setting, and
in the change processing, the linear operation mode is changed to the circular-arc operation mode when the characteristic manner of tracing has changed.

13. The display device according to claim 10,
wherein the change processing, when a consecutive number of the histories indicating the operation mode decided in the decision processing is less than a predetermined number of histories, changes the one operation mode to the other operation mode.

14. The display device according to claim 10,
wherein in the linear operation mode, a vertical direction operation mode in which the image is changed by tracing the operation surface in a substantially vertical direction, and a horizontal direction operation mode in which the image is changed by tracing the operation surface in a substantially horizontal direction, are set, and
the decision processing, when deciding the linear operation mode as the operation mode, based on the discriminated characteristics, further decides which one of the vertical direction operation mode and the horizontal direction operation mode is the operation mode.

15. The display device according to claim 10,
wherein when a change amount of the image has reached a threshold value, limiting processing is executed to limit the change amount of the image when the operation surface was traced.

16. The display device according to claim 10,
wherein the image is a rotatable image representing an operation member for adjusting a physical quantity, and is an image that displays an adjustment amount according to the rotational position of the image.

17. The display device according to claim 16,
wherein the operation member is a rotatable knob.

18. The display device according to claim 17,
wherein a minimum value, a median value, and a maximum value of the rotation amount of the knob are displayed, and an instruction indicating the rotational position of the knob is configured not to move between the minimum value and the maximum value where the median value is not provided.

19. An image display method in a device provided with a touch panel, the image display method comprising:
setting, as an operation mode for changing an image displayed on an operation surface of the touch panel by tracing the operation surface, a linear operation mode in which the image is changed by tracing the operation surface substantially along a straight line, and a circular-arc operation mode in which the image is changed by tracing the operation surface substantially along a circular arc;
discriminating a characteristic manner in which the touch panel is traced based on information acquired from the touch panel when the operation surface is being traced, and deciding which one of the linear operation mode and the circular-arc operation mode based on the discriminated characteristics is the operation mode, as a decision processing; and
changing the one operation mode decided by the decision to the other operation mode when there is a change in the characteristic manner of tracing, as a change processing,
wherein
the information includes a first velocity component indicating a velocity component in a first direction when the operation surface was traced, and a second velocity component indicating a velocity component in a second direction different from the first direction,
the decision processing compares the first velocity component with the second velocity component, and based on the result of that comparison, decides which one of the linear operation mode and the circular-arc operation mode is the operation mode, and
the change processing, when a plurality of histories of comparison results in the decision processing are stored and the newest histories tend to indicate an operation mode different than the operation mode decided in the decision processing, changes the one operation mode to the other operation mode.

20. An image display method in a device provided with a touch panel and a control unit, the image display method comprising the steps of:
setting using the control unit, as an operation mode for changing an image displayed on an operation surface of the touch panel by tracing the operation surface, a linear operation mode in which the image is changed by tracing the operation surface substantially along a straight line, and a circular-arc operation mode in which the image is changed by tracing the operation surface substantially along a circular arc;
discriminating using the control unit a characteristic manner in which the touch panel is traced based on information acquired from the touch panel when the operation surface is being traced, and
deciding using the control unit which one of the linear operation mode and the circular-arc operation mode based on the discriminated characteristics is the operation mode; and
changing using the control unit the one operation mode decided by the decision to the other operation mode when there is a change in the characteristic manner of tracing wherein
- the information acquired from the touch panel includes a first velocity component indicating a velocity component in a first direction when the operation surface was traced, and a second velocity component indicating a velocity component in a second direction different from the first direction,
- in the deciding step the control unit compares the first velocity component with the second velocity component, and based on the result of that comparison, decides which one of the linear operation mode and the circular-arc operation mode is the operation mode, and
- in the changing step, when a plurality of histories of comparison results in the decision processing are stored and the newest histories tend to indicate an operation mode different than the operation mode decided in the decision processing, the control unit changes the one operation mode to the other operation mode.

* * * * *